United States Patent
Mayes et al.

(10) Patent No.: US 7,583,668 B1
(45) Date of Patent: Sep. 1, 2009

(54) SECURITY SYSTEM FOR NETWORK ADDRESS TRANSLATION SYSTEMS

(75) Inventors: John C. Mayes, Redwood City, CA (US); Brantley W. Coile, Athens, GA (US)

(73) Assignee: Cisco Technology, Inc., Sunnyvale, CA (US)

( * ) Notice: Subject to any disclaimer, the term of this patent is extended or adjusted under 35 U.S.C. 154(b) by 436 days.

(21) Appl. No.: 11/502,021

(22) Filed: Aug. 9, 2006

Related U.S. Application Data

(63) Continuation of application No. 10/160,831, filed on May 31, 2002, now Pat. No. 7,113,508, which is a continuation of application No. 09/131,812, filed on Aug. 10, 1998, now Pat. No. 6,510,154, which is a continuation of application No. 08/552,807, filed on Nov. 3, 1995, now Pat. No. 5,793,763.

(51) Int. Cl.
*H04Q 11/04* (2006.01)
(52) U.S. Cl. .......... 370/389; 370/392; 370/395.52; 370/401; 709/245; 709/249; 709/250
(58) Field of Classification Search .......... None
See application file for complete search history.

(56) References Cited

U.S. PATENT DOCUMENTS

| | | | |
|---|---|---|---|
| 4,962,532 A | 10/1990 | Kasiraj et al. |
| 5,159,592 A | 10/1992 | Perkins |
| 5,185,860 A | 2/1993 | Wu |
| 5,287,103 A | 2/1994 | Kasprzyk et al. |
| 5,371,852 A | 12/1994 | Attanasio et al. |
| 5,377,182 A | 12/1994 | Monacos |
| 5,406,557 A | 4/1995 | Baudoin |
| 5,426,637 A | 6/1995 | Derby et al. |
| 5,430,715 A | 7/1995 | Corbalis et al. |
| 5,477,531 A | 12/1995 | McKee et al. |
| 5,513,337 A | 4/1996 | Gillespie et al. |
| 5,550,984 A | 8/1996 | Gelb |
| 5,560,013 A | 9/1996 | Scalzi et al. |
| 5,581,552 A | 12/1996 | Civanlar et al. |
| 5,606,688 A | 2/1997 | McNutt et al. |

(Continued)

OTHER PUBLICATIONS

Internet posting for Test Sites to Beta Test and IP Address Translation product; posted on firewalls mailing list: posting made on or after Oct. 28, 1994.

(Continued)

*Primary Examiner*—Chi H. Pham
*Assistant Examiner*—Shick Hom
(74) *Attorney, Agent, or Firm*—Weaver Austin Villeneuve & Sampson LLP

(57) ABSTRACT

A system and method are disclosed for providing perform network address translation of network layer addresses of packets exchanged between nodes on a local network and nodes outside the local network. This allows local hosts in an enterprise network to share global IP addresses from a limited pool of such addresses available to the enterprise. The translation may be accomplished by replacing the source address in headers on packets destined for the Internet and by replacing destination address in headers on packets entering the local enterprise network from the Internet. Packets arriving from the Internet are screened by an adaptive security algorithm. According to this algorithm, packets are dropped and logged unless they are deemed nonthreatening.

16 Claims, 12 Drawing Sheets

U.S. PATENT DOCUMENTS

| | | | |
|---|---|---|---|
| 5,621,727 | A | 4/1997 | Vaudreuil |
| 5,623,601 | A | 4/1997 | Vu |
| 5,664,185 | A | 9/1997 | Landfield et al. |
| 5,757,924 | A | 5/1998 | Friedman et al. |
| 5,790,548 | A | 8/1998 | Sistanizadeh et al. |
| 5,793,763 | A | 8/1998 | Mayes et al. |
| 5,856,974 | A | 1/1999 | Gervais et al. |
| 5,870,386 | A | 2/1999 | Perlman et al. |
| 6,061,797 | A | 5/2000 | Jade et al. |
| 6,128,664 | A | 10/2000 | Yanagidate et al. |
| 6,154,839 | A | 11/2000 | Arrow et al. |
| 6,178,450 | B1 | 1/2001 | Ogishi et al. |
| 6,188,671 | B1 | 2/2001 | Chase et al. |
| 6,188,684 | B1 | 2/2001 | Setoyama et al. |
| 6,233,234 | B1 | 5/2001 | Curry et al. |
| 6,353,614 | B1 | 3/2002 | Borella et al. |
| 6,434,627 | B1 | 8/2002 | Millet et al. |
| 6,510,154 | B1 * | 1/2003 | Mayes et al. ............... 370/389 |
| 7,032,242 | B1 * | 4/2006 | Grabelsky et al. ............ 726/11 |
| 7,113,508 | B1 * | 9/2006 | Mayes et al. ............... 370/389 |
| 2004/0071149 | A1 * | 4/2004 | Kim et al. .................. 370/401 |

OTHER PUBLICATIONS

Y. Reckhter. B. Moskowitz, D. Karrenberg, and G. de Groot. "Address Allocation for Private Internets." RFC 1597. T.J. Watson Research Center, IBM Corp., Chrysler Corp., RIPE NCC. Mar. 1994.

K. Egevang and P. Francis. "The IP Network Address Translator (NAT)." RFC 1631. Cray Communications. NTT. May 1994.

* cited by examiner

SECURITY SYSTEM FOR NETWORK ADDRESS TRANSLATION SYSTEMS

CROSS-REFERENCE TO RELATED APPLICATION

This application is a continuation of U.S. patent application Ser. No. 10/160,831, entitled "SECURITY SYSTEM FOR NETWORK ADDRESS TRANSLATION SYSTEMS" by John Mayes et al., filed on May 31, 2002, which is now U.S. Pat. No. 7,113,508 a continuation of Ser. No. 09/131,812 now U.S. Pat. No. 6,510,154, entitled "SECURITY SYSTEM FOR NETWORK ADDRESS TRANSLATION SYSTEMS" by John Mayes et al., filed on Aug. 10, 1998, now U.S. Pat. No. 6,510,154 which is a continuation of Ser. No. 08/552,807 now U.S. Pat. No. 5,793,763, entitled "SECURITY SYSTEM FOR NETWORK ADDRESS TRANSLATION SYSTEMS" by John Mayes et al., filed on Nov. 3, 1995, and from each of which priority is claimed pursuant to the provisions of 35 U.S.C. 120. Each of these applications is incorporated by reference herein in its entirety for all purposes.

BACKGROUND OF THE INVENTION

The present invention relates to address translation systems for mapping local Internet Protocol "IP" addresses used by hosts on a private network to globally unique IP addresses for communication with hosts on the Internet. The address translation systems have adaptive security mechanisms to protect the private network from certain packet types sent from the Internet.

Private networks are commonly connected to the Internet through one or more routers so that hosts (PCs or other arbitrary network entities) on the private network can communicate with nodes on the Internet. Typically, the host will send packets to locations both within its private network and on the Internet. To receive packets from the Internet, a private network or a host on that network must have a globally unique 32-bit IP address. Each such IP address has a four octet format. Typically, humans communicate IP addresses in a dotted decimal format, with each octet written as a decimal integer separated from other octets by decimal points.

Global IP addresses are issued to enterprises by a central authority known as the Internet Assigned Number Authority ("IANA"). The IANA issues such addresses in one of three commonly used classes. Class A IP addresses employ their first octet as a "netid" and their remaining three octets as a "hostid." The netid identifies the enterprise network and the hostid identifies a particular host on that network. As three octets are available for specifying a host, an enterprise having class A addresses has $2^{24}$ (nearly 17 million) addresses at its disposal for use with possible hosts. Thus, even the largest companies vastly underuse available class A addresses. Not surprisingly, Class A addresses are issued to only very large entities such as IBM and ATT. Class B addresses employ their first two octets to identify a network (netid) and their second two octets to identify a host (hostid). Thus, an enterprise having class B addresses can use those addresses on approximately 64,000 hosts. Finally, class C addresses employ their first three octets as a netid and their last octet as a hostid. Only 254 host addresses are available to enterprises having a single class C netid.

Unfortunately, there has been such a proliferation of hosts on the Internet, coupled with so many class A and B licenses issued to large entities (who have locked up much address space), that it is now nearly impossible to obtain a class B address. Many organizations now requiring Internet access have far more than 254 hosts—for which unique IP addresses are available with a single class C network address. It is more common for a mid to large size enterprise to have 1000 to 10,000 hosts. Such companies simply can not obtain enough IP addresses for each of their hosts.

To address this problem, a Network Address Translation ("NAT") protocol has been proposed. See K. Egevang and P. Francis, "The IP Network Address Translator (NAT)," Request For Comments "RFC" 1631, Cray Communications, NTT, May 1994 which is incorporated herein by reference for all purposes. NAT is based on the concept of address reuse by private networks, and operates by mapping the reusable IP addresses of the leaf domain to the globally unique ones required for communication with hosts on the Internet. In implementation, a local host wishing to access the Internet receives a temporary IP address from a pool of such addresses available to the enterprise (e.g., class C 254 addresses). While the host is sending and receiving packets on the Internet, it has a global IP address which is unavailable to any other host. After the host disconnects from the Internet, the enterprise takes back its global IP address and makes it available to other hosts wishing to access outside networks.

To implement a NAT, a translation system must be provided between the enterprise private network and the Internet. By virtue of this location, the translation must act as a firewall to protect the local private network from unwanted Internet packets. In view of this requirement, it would be desirable to have a system which employs NAT and provides a secure firewall.

SUMMARY OF THE INVENTION

Various aspects of the present invention are directed to different methods, systems, and computer program products for providing network connections between nodes on a local network and nodes outside the local network. According to various embodiments, network address translation may be performed on network layer addresses of packets exchanged between nodes on the local network and nodes outside the local network. A network address translation list may be generated which includes one or more translations, each specifying a local network layer address of a local node and an associated global unique network layer address. IP addresses in packets may be matched against IP addresses specified in the local network layer address or the associated global unique network layer address of one or more translations in the network address translation list. Additionally, in at least one embodiment, a firewall specifying at least one security criterion may be utilized to protect the local network from packets that pose a security risk.

Additional objects, features and advantages of the various aspects of the present invention will become apparent from the following description of its preferred embodiments, which description should be taken in conjunction with the accompanying drawings.

DESCRIPTION OF THE PREFERRED EMBODIMENTS

1. Definitions

Figure 1:
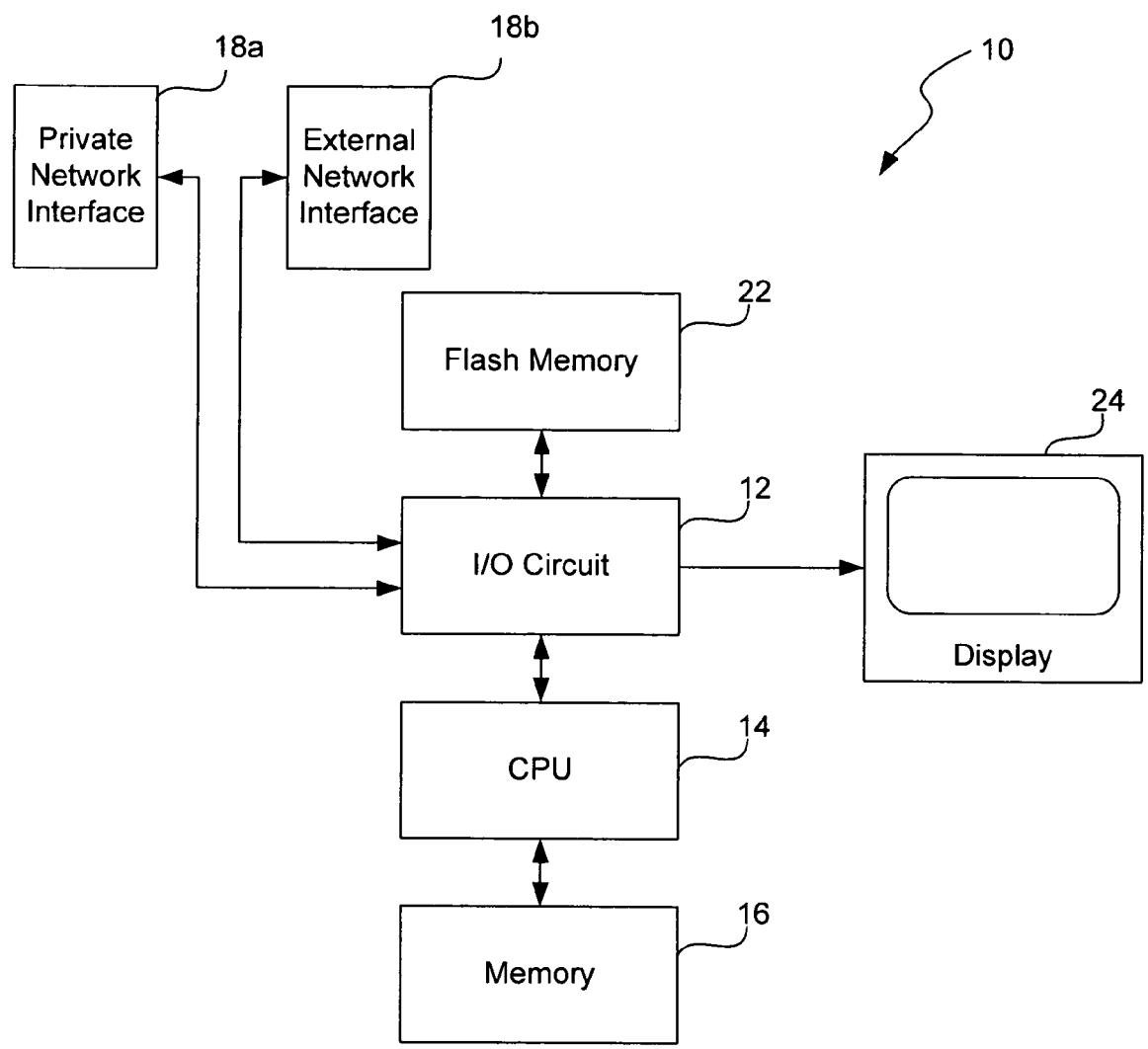
FIG. 1 is a block diagram of a computer system for implementing the processes of a Network Address Translation system in accordance with this invention.

The following terms are used in the instant specification. Their definitions are provided to assist in understanding the preferred embodiments described herein.

A "host" is a PC or other arbitrary network entity residing on a network and capable of communicating with entities outside of its own network through a router or bridge.

A "router" is a piece of hardware which operates at the network layer to direct packets between various nodes of one or more networks. The network layer generally allows pairs of entities in a network to communicate with each other by finding a path through a series of connected nodes.

A "packet" is a collection of data and control information including source and destination node addresses and source and destination ports. The octet of destinations and ports make every connection and packet unique.

2. Overview

The invention employs various process steps involving data manipulation. These steps require physical manipulation of physical quantities. Typically, these quantities take the form of electrical or magnetic signals capable of being stored, transferred, combined, compared, and otherwise manipulated. It is sometimes convenient, principally for reasons of common usage, to refer to these signals as bits, values, variables, characters, data packets, or the like. It should be remembered, however, that all of these and similar terms are to be associated with the appropriate physical quantities and are merely convenient labels applied to these quantities.

Further, the manipulations performed are often referred to in terms, such as translating, running, selecting, specifying, determining, or comparing. In any of the operations described herein that form part of the present invention, these operations are machine operations. Useful machines for performing the operations of the present invention include general purpose and specially designed computers or other similar devices. In all cases, there should be borne in mind the distinction between the method of operations in operating a computer or other processing device and the method of computation itself. The present invention relates to method steps for operating a Network Address Translation system in processing electrical or other physical signals to generate other desired physical signals.

The present invention also relates to an apparatus for performing these operations. This apparatus may be specially constructed for the required purposes, or it may be a general purpose programmable machine selectively activated or reconfigured by a computer program stored in memory. The processes presented herein are not inherently related to any particular computer or other apparatus. In particular, various general purpose machines may be used with programs written in accordance with the teachings herein, or it may be more convenient to construct a more specialized apparatus to perform the required method steps. The general structure for a variety of these machines will appear from the description given below.

Still further, the present invention relates to machine readable media on which are stored program instructions for performing operations on a computer. Such media includes by way of example magnetic disks, magnetic tape, optically readable media such as CD ROMs, semiconductor memory such as PCMCIA cards, etc. In each case, the medium may take the form of a portable item such as a small disk, diskette, cassette, etc., or it may take the form of a relatively larger or immobile item such as a hard disk drive or RAM provided in a computer.

FIG. 1 shows a typical computer-based system which may be used as a secure Network Address Translation system of the present invention. Shown is a computer 10 which comprises an input/output circuit 12 used to communicate information in appropriately structured form to and from the parts of computer 10 and associated equipment, a central processing unit 14, and a memory 16. These components are those typically found in most general and special purpose computers 10 and are intended to be representative of this broad category of data processors.

Connected to the input/output circuit 12 are inside and outside high speed Local Area Network interfaces 18a and 18b. The inside interface 18a will be connected to a private network, while the outside interface 18b will be connected to an external network such as the Internet. Preferably, each of these interfaces includes (1) a plurality of ports appropriate for communication with the appropriate media, and (2) associated logic, and in some instances (3) memory. The associated logic may control such communications intensive tasks as packet integrity checking and media control and management. The high speed interfaces 18a and 18b are preferably multiport Ethernet interfaces, but may be other appropriate interfaces such as FDDI interfaces, etc.

The computer system may also include an input device (not shown) such as a keyboard. A flash memory device 22 is coupled to the input/output circuit 12 and provides additional storage capability for the computer 10. The flash memory device 22 may be used to store programs, data and the like and may be replaced with a magnetic storage medium or some other well known device. It will be appreciated that the information retained within the flash memory device 22, may, in appropriate cases, be incorporated in standard fashion into computer 10 as part of the memory 16.

In addition, a display monitor 24 is illustrated which is used to display the images being generated by the present invention. Such a display monitor 24 may take the form of any of several well-known varieties of cathode ray tube displays and flat panel displays or some other type of display.

Although the system shown in FIG. 1 is a preferred computer system of the present invention, the displayed computer architecture is by no means the only architecture on which the present invention can be implemented. For example, other types of interfaces and media could also be used with the computer.

Figure 2:
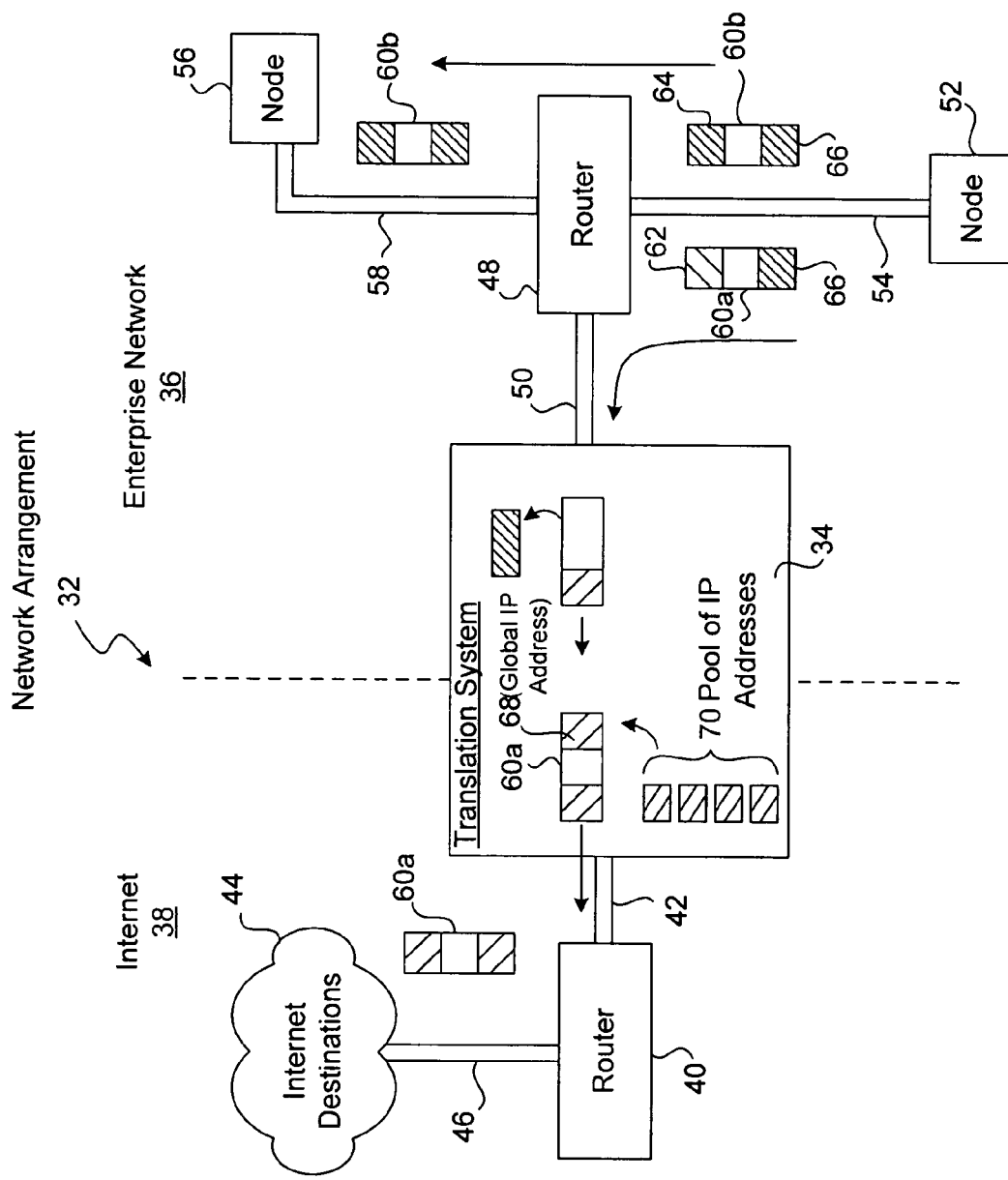
FIG. 2 is a schematic diagram of a private network segment connected to the Internet via a NAT system of this invention.

FIG. 2 shows a network arrangement 32 employing a network address translation system 34 of the present invention. Translation system 34 acts as a connection between an enterprise network 36 and the Internet 38. On the Internet side, translation system 34 connects to an Internet router 40 via a line 42. Internet router 40, in turn, connects to Internet destinations 44 through a line 46. On the enterprise network side, translation system 34 connects to a router 48 via a line 50. Router 48 is, in turn, linked to various nodes on the enterprise network 36 including node 52 (via line 54) and node 56 (via line 58).

As an example, assume that node 52 sends packets 60a and 60b to router 48 along line 54. Packet 60a is destined for the Internet as indicated by a packet header 62. In contrast, packet 60b is destined to for a node on the enterprise network as indicated by packet header 64. Upon receiving packets 60a and 60b, router 48 then routes packet 60b along line 58 to node 56 and routes packet 60a along line 50 to translation system 34.

To this point, the system behaves consistent with most conventional networking protocols. However, packet 60a contains source address 66 which is not a globally unique IP address. Therefore, node 52 can not expect a reply from the Internet destination of packet 60a. To remedy this problem, packet 60a is routed through translation system 34 which modifies the packet so that it can establish a connection with a desired Internet destination. Specifically, when data packet 60a reaches translation system 34, its local source address 66 is replaced with an authorized global IP source address 68 selected from a pool of available global IP addresses 70. Pool 70 includes all or some subset of the global IP source addresses allocated to enterprise network 36.

After packet 60a has been retooled with global IP address 68, translation system 34 sends it along line 42 to Internet router 40. Router 40 then forwards it to the appropriate destination. Thereafter the Internet destination can reply with a packet of its own destined for global IP address 68. Upon receipt of such packet, translation system 34 will determine if it presents a security risk. If not, it will replace address 68 on the inbound packet with the local address of node 52 and then forward the modified packet to router 48. After the node 52 finishes its Internet session, address 68 may be made available to other nodes desiring Internet access. In this manner, a relatively small number of global IP addresses can be used by a much larger network of hosts.

3. Processing of Packets Received by the NAT System

The methods of this invention apply a security algorithm to network address translation. The basic address translation methodology may be directly adapted from RFC 1631, previously incorporated by reference.

Figure 3:
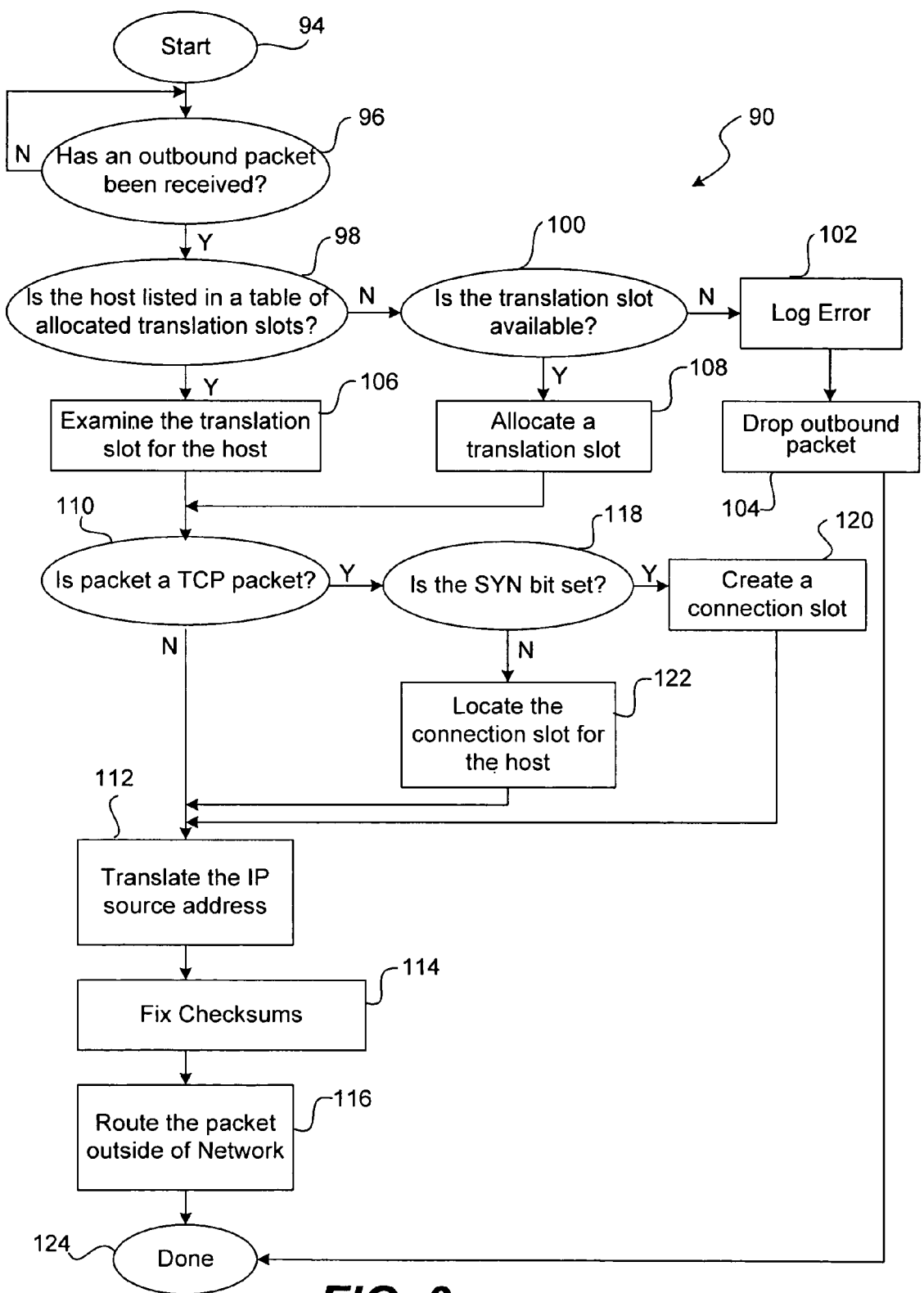
FIG. 3 is a process flow diagram showing generally the steps involved in transmitting an outbound packet through a NAT system to the Internet in accordance with this invention.

FIG. 3 details a process 90 that may be employed by network address translation system 34 upon receipt of packet from enterprise network 36. Such outbound packets are received at the inside interface 18a of system 34. The process begins at 94 and in a decision step 96 determines whether an outbound packet has been received from a host on enterprise network 36. If not, the system simply awaits receipt of such packet. If, on the other hand, such packet was indeed received, a decision step 98 determines whether the host sending the packet is listed in a table of allocated translation slots. This table includes a list of global and local IP addresses for all hosts that have a translation slot opened. Translation slots will be described in more detail below. For now, it is sufficient to recognize that a host's local IP address will appear in the table of allocated translation slots if a translation slot has indeed been allocated for that host. To perform step 98, the NAT system first examines the outbound packet source header to identify the local IP address, and then determines if that address is located in the translation slot table. If so, step 98 is answered in the affirmative.

Assuming that step 98 is in fact answered yes (i.e., the translation slot table lists the local IP source address on the packet), a process step 106 examines the actual translation slot for the local host identified in the translation slot table. If on the other hand, step 98 is answered in the negative (i.e., the host sending the packet is not listed in the table of allocated translation slots), a decision step 100 determines whether a new translation slot is available. If not, an error is logged at process step 102 and the packet is dropped without transmission at a step 104. Thereafter, process control returns to step 96, and system 34 awaits the next outbound packet. Steps 102 and 104 are necessary because the number of translation slots is limited by the number of global IP addresses available to the enterprise network. If the enterprise has only a single class C address collection, for example, no more than 254 translation slots can be used at any given time. The system of this invention does release global IP addresses (i.e., it closes translation slots and removes their entries from the translation slot table) after a defined timeout period. Such period may be adjusted by the network according to the specific network's requirements. A typical default value is 24 hours for example.

Assuming that decision step 100 is answered in the affirmative (i.e., a free translation slot exists), a process step 108 allocates one such translation slot to the host sending the packet. The NAT system the fills the newly allocated slot with various pieces of relevant information (detailed below) including the local host's local IP address and a global IP address selected from the pool of available addresses. In a specific embodiment, the global unique IP address selected from this pool is obtained by simply picking the next available address sequentially. The NAT system also enters the global and local IP addresses for the new translation slot in the translation slot table.

Now, regardless of how a translation slot was identified (via step 106 or 108), the next step is a decision step 110 which determines whether the outbound packet is a Transmission Control Protocol "TCP" packet. As known to those of skill in the art, this determination can be made by checking the appropriate field in the packet header. The TCP protocol requires a connection be established before communication can be commenced.

If the outbound packet turns out not to be a TCP packet, a process step 112 simply translates the IP source address on that packet. In other words, the private source address initially appearing on the packet is replaced with the global unique IP address in the associated translation slot. After the IP source address has been replaced at step 112, a process step 114 fixes the checksums at the end of the packet. Specifically, the address translator will modify the IP checksum and the TCP checksum. Since the differences between the original and translated versions of the packet are known, the checksums are efficiently updated with a simple adjustment rather than a complete recalculation. Details including sample code are provided in RFC 1631. The address translator must also modify those parts of ICMP and FTP packets where the IP address appears. Next, the retooled packet is routed by translation system 34 to the Internet. The process is then complete at 124.

Assuming that decision step 110 determines that the packet is indeed a TCP packet, a decision step 118 then determines whether the "synchronized sequence number" SYN bit has been set in the TCP segment of a TCP header. As known to those skill in the art, this bit is set in the "code bits" section of the TCP header. When the SYN bit is set, it implies that the local host is attempting to establish a connection with a host on the Internet. Assuming that the internal host is in fact attempting to establish a connection, (i.e., decision step 118 is answered in affirmative), translation system 34 creates a new connection slot (if any are available) at a process step 120. That slot is filled information uniquely describing the connection: the remote IP address, the remote port number, and the local port number. Concurrently therewith, the new connection is registered in a "connection field" of the translation slot. Thereafter, process control is directed to step 112 were the IP source address is translated as described above. Then, the packet checksums are corrected and the packet is routed to the Internet as described above. Assuming that decision step 118 is answered in the negative (i.e., the SYN bit is not set), the system will assume that a TCP session has already been synchronized and locate the connection object associated with internal host's current connection as a step 122. This may be accomplished with a hashing algorithm for example. Thereafter, process control is directed to step 112 where the translation, modification, and forwarding functions are performed as described above. If the outbound packet is a TCP packet without its SYN bit set and no existing connection is open, an error has occurred.

It should be apparent from the above discussion that there is essentially no security mechanism to block outbound packets. Most enterprises expect this behavior.

Figures 4A, 4B:
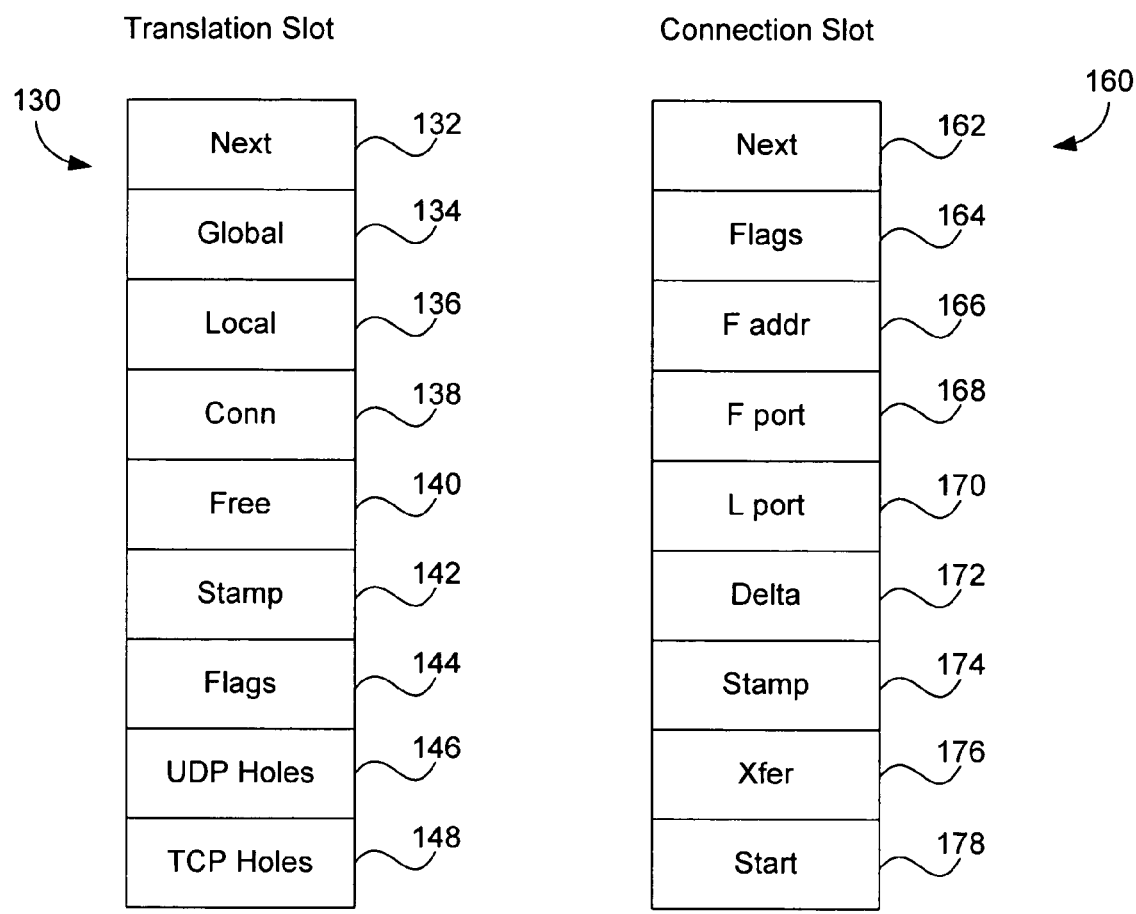
FIG. 4A is a schematic illustration of a translation slot and associated fields in accordance with this invention.
FIG. 4B is a schematic illustration of a connection slot and associated fields in accordance with this invention.

FIG. 4A is a schematic depiction of a translation slot 130 provided for use with the system/methods of this invention. In practice, the translation slot takes the form of a data structure stored in memory of the NAT system. In the translation slot data structure, a "next" field 132 holds a pointer to the next translation slot in the translation slot table. This field is updated whenever the next successive translation slot times out while the slot at issue remains. A "global" field 134 provides the global unique IP address temporarily held by the host having the translation slot. A "local" address field 136 specifies the local address of the host. The global and local address fields are set when the translation slot is opened and they remain fixed throughout the life of the slot.

A "connection" field 138 contains a listing of the connection slots, if any, appended to the translation slot. More than one connection slot may be associated with a given translation slot, as many users may be using a given host to access the Internet. Each associated process will have its own connection slot. The connection field 138 is updated each time a new connection slot is opened or timed out. Next, a "free" field 140 is reserved for a connection slot of a static translation slot. A "stamp" field 142 provides a time stamp indicating when the translation slot last sent or received a packet. Thus, the stamp field is updated each time an Internet packet passes from or to the local host. This is used for purposes of timing out a translation slot.

Next, a "flags" field 144 contains one or more flags that may be set in connection with the translation slot 130. Examples of such flags include a "static flag" to be set when the translation slot is a "static" rather "dynamic" translation slot. This distinction will be discussed in more detail below. Another flag is a "port" flag to be set when a port command is issued by a local host initiating an FTP session. The User Datagram Protocol Holes "UDP Holes" field 146 and the "TCP Holes" field 148 specify "conduits" or exceptions to the adaptive security algorithm of this invention. These conduits which apply only to static translation slots will be discussed in more detail below. The UDP Holes and TCP Holes fields are set by the system administrator when configuring the system with static translation slots.

FIG. 4B is a schematic depiction of a connection slot 160 which may be appended to a translation slot as described above. In this slot, a "next" field 162 holds a pointer to the next connection slot associated with the appropriate translation slot. Next, a "flags" field 164 contains any flags associated with the connection slot. A "faddr" field 166 specifies an address for the foreign host to which the connection is made. A "fport" field 168 specifies a port of the foreign host. As is known to those of skill in the art, a port is a TCP/IP transport protocol used to distinguish among multiple destinations within a given host computer. Some destinations are reserved for standard services such as e-mail. Next, an "lport" field 170 specifies a port number for the local host. Values are provided to fields 166, 168, and 170 when the connection slot is opened and these fields remain unchanged throughout the life of the connection slot.

A "delta" field 172 specifies an adjustment (delta) to the TCP sequence number as required for address translation in FTP connections. This is because FTP PORT command arguments include an IP address in ASCII. Substituting the ASCII IP address may change the packet size. The delta value specifies by how much the sequence number must be adjusted to account for any difference in packet size due to substitution of the ASCII number. Field 172 must be updated everytime a PORT command is issued. Next, a "stamp" field 174 specifies the time that the connection was last used. This is used for timing out a connection slot. An "xfer" field 176 specifies the total number of bytes transferred while the connection slot is open. The value in this field will continue to grow as more packets are sent and received over the connection. Finally, a "start" field 178 specifies the time that the connection was created.

Figure 5:
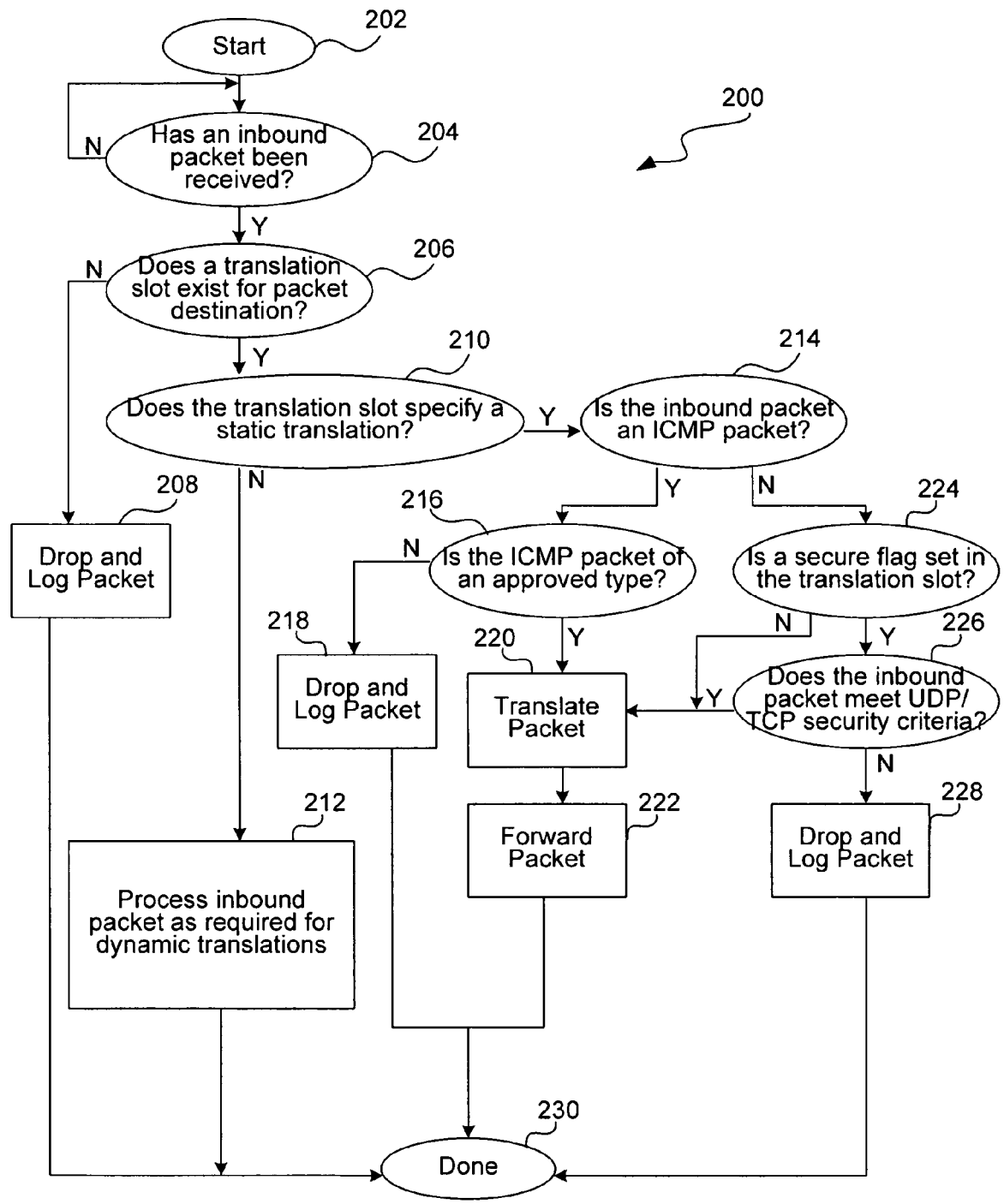
FIG. 5 is a process flow diagram showing generally how an inbound packet is treated by a NAT system of this invention.

The process by which translation system 34 handles inbound packets from the Internet (and arriving at NAT system outside interface 18b) is depicted in a process flow diagram 200 shown in FIG. 5. It should be understood that this procedure includes an adaptive security algorithm that does not block outbound packets. In a preferred embodiment, adaptive security follows these rules:

1. Allow any TCP connections that originate from the inside network.

2. Ensure that if an FTP data connection is initiated to a translation slot, there is already an FTP control connection between that translation slot and the remote host. Also ensure that a port command has been issued between the same two hosts. If these criteria are not met, the attempt to initiate an FTP data connection is dropped and logged.

3. Prevent the initiation of a TCP connection to a translation slot from the outside. The offending packet is dropped and logged.

4. Allow inbound UDP packets only from DNS. NFS is explicitly denied.

5. Drop and log source routed IP packets sent to any translation slot on the translation system.

6. Allow only ICMP of types 0, 3, 4, 8, 11, 12, 17 and 18.

7. Ping requests from outside to dynamic translation slots are silently dropped.

8. Ping requests to static translation slots are answered.

Process 200 begins at 202 and then a decision step 204 determines whether an inbound packet has been received. If not, the system simply awaits receipt of such packet. When such packet is received, a decision step 206 determines whether a translation slot exists for the global IP destination address on the packet. If no such translation slot exists, it is impossible to discern which local host is the intended recipient of the packet. Thus, a process step 208 drops and logs the packet. This means that the inbound packet never reaches the enterprise network 36 and its content is logged for postmortem evaluation by a network administrator.

Assuming that decision step 206 is answered in the affirmative (i.e., a translation slot exists for the incoming packet), a decision step 210 determines whether that translation slot references a static translation. A static translation slot "hardwires" to a given internal host machine a globally unique IP address that does not time out. Thus, the host machine maintains an ongoing mapping of its local address to a specific global IP address held by the enterprise. This may be appropriate for internal hosts acting as Internets servers (email, anonymous FTP, World-Wide Web etc.). For all practical purposes, the host machine having the static connection slot appears to be a stand-alone "wide open" node on the Internet. As explained in more detail below, static translation slots unlike dynamic translation slots can have conduits or exceptions to the adaptive security algorithm outlined below.

If decision step 210 is answered in the negative, it can be assumed the translation slot associated with the inbound packet is a dynamic translation slot. In that case, a process step 212 will handle the inbound packet according to a specific algorithm for dynamic translations (see FIG. 10 as discussed below). Thereafter, the process is completed at 230.

Assuming that decision step 210 is answered in the affirmative (i.e., the translation slot is static translation slot), a decision step 214 determines whether the inbound packet is an ICMP frame. As known to those of skill in the art, ICMP packets are used, for among purposes, to handle error and control messages. Many ICMP functions do not pose a security danger. However, others such as a "redirect" (which changes a route in a routing table) pose potential security risks. Thus, if the inbound packet is an ICMP packet a decision step 216 determines whether that packet is of an approved type. Assuming that the ICMP packet is not of an approved type, a process step 218 drops and logs the packet as described above (in the context of step 208). Thereafter, the process is completed at 230.

Assuming that decision step 216 determines that the ICMP packet is of an approved type, a process step 220 translates the inbound packet by replacing the global IP address with a local IP address provided in the static translation slot for the local host receiving the inbound packet. In addition, the system will fix the checksums in the packet as appropriate based upon the address change. Thereafter, at a step 222, the translated inbound packet is forwarded to the local host and the process is completed at 230.

If decision step 214 determines that the inbound packet is not an ICMP packet, a decision step 224 determines whether a "secure flag" is set for the static translation. This can be determined by simply looking a the appropriate field in the static translation slot (field 144) associated with the destination host. Enterprise hosts having static translation slots may or may not employ the adaptive security mechanisms of the present invention. It is up to the user or administrator to configure such hosts appropriately (by setting the secure flag if adaptive security is to be employed). Assuming that decision step 224 is answered in the negative (i.e., the secure flag is not set), process control is directed to step 220 where the inbound packet is translated as described above. Thereafter, the packet is forwarded at step 222 and the process is completed as described above.

If decision step 224 determines that the secure flag is set in the static translation slot, the system will scrutinize the inbound packet according to the adaptive security mechanism at a step 226. Specifically, step 226 will test the inbound packet to determine whether it meets certain "UDP" and "TCP" security criteria. If the step determines that the inbound packet does not pose a security risk, it is translated and forwarded at steps 220 and 222 as described above. If, however, the inbound packet is found to pose a security risk, it is dropped and logged at a step 228 before the process is completed at 230.

As noted, only certain "nonthreatening" types of ICMP messages will be accepted. Following this paragraph is a list of some ICMP message types. In a preferred embodiment, only types 0, 3, 4, 8, 11, 12, 17 and 18 are allowed. This implies that ICMP redirects (type 5) and others are denied by the adaptive security mechanism.

| Type Field | ICMP Message Type |
| --- | --- |
| 0 | Echo Reply |
| 3 | Destination Unreachable |
| 4 | Source Quench |
| 5 | Redirect (change a route) |
| 8 | Echo Request |
| 11 | Time Exceeded for a Datagram |
| 12 | Parameter Problem on a Datagram |
| 13 | Timestamp Request |
| 14 | Timestamp Reply |
| 15 | Information Request |
| 16 | Information Reply |
| 17 | Address Mask Request |
| 18 | Address Mask Reply |

Figure 6:
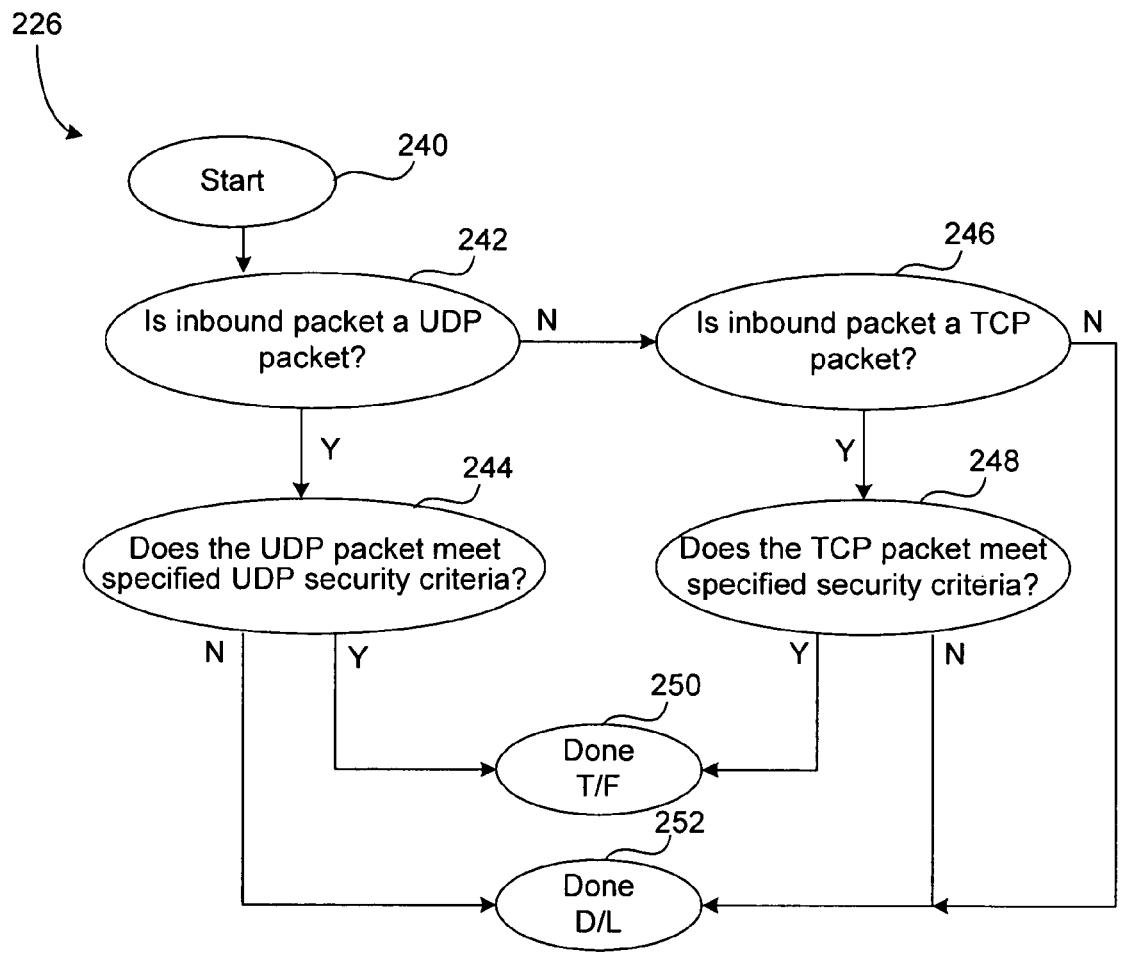
FIG. 6 is a process flow diagram illustrating in some detail the security features employed to screen inbound packets destined for a local host having a static translation slot.

The process of determining whether an inbound packet meets the UDP and TCP security criteria of this invention (step 226 of FIG. 5) is depicted in FIG. 6. The process begins at 240 and in a decision step 242 determines whether inbound packet is a UDP packet. As known to those of skill art, this information can be readily discerned by checking the appropriate field of an IP datagram header. Assuming that the system determines that the inbound packet is indeed a UDP packet, a decision step 244 determines whether that packet meets specified UDP security criteria. If so, the process is completed at 250 with the packet being made available for translation for an forwarding as described with reference to FIG. 5. If, however, decision step 244 determines that the UDP packet does not met the required security criteria, the process is completed at 252 with the UDP packet being dropped and logged as described with respect to step 228 of FIG. 5.

Assuming that decision step 242 determines that the datagram structure of the inbound packet is not a UDP packet, a decision step 246 determines whether that datagram is a TCP packet. If so, a decision step 248 determines whether TCP packet meets the TCP security criteria provide for the translation system. If so, the process is completed at 250 as described above. If not, the process is completed at 252 as described above. Finally, if decision step 246 is answered in the negative (i.e., the inbound packet is neither a UDP nor a TCP packet), the process is completed at 252 as described above.

Figure 7:
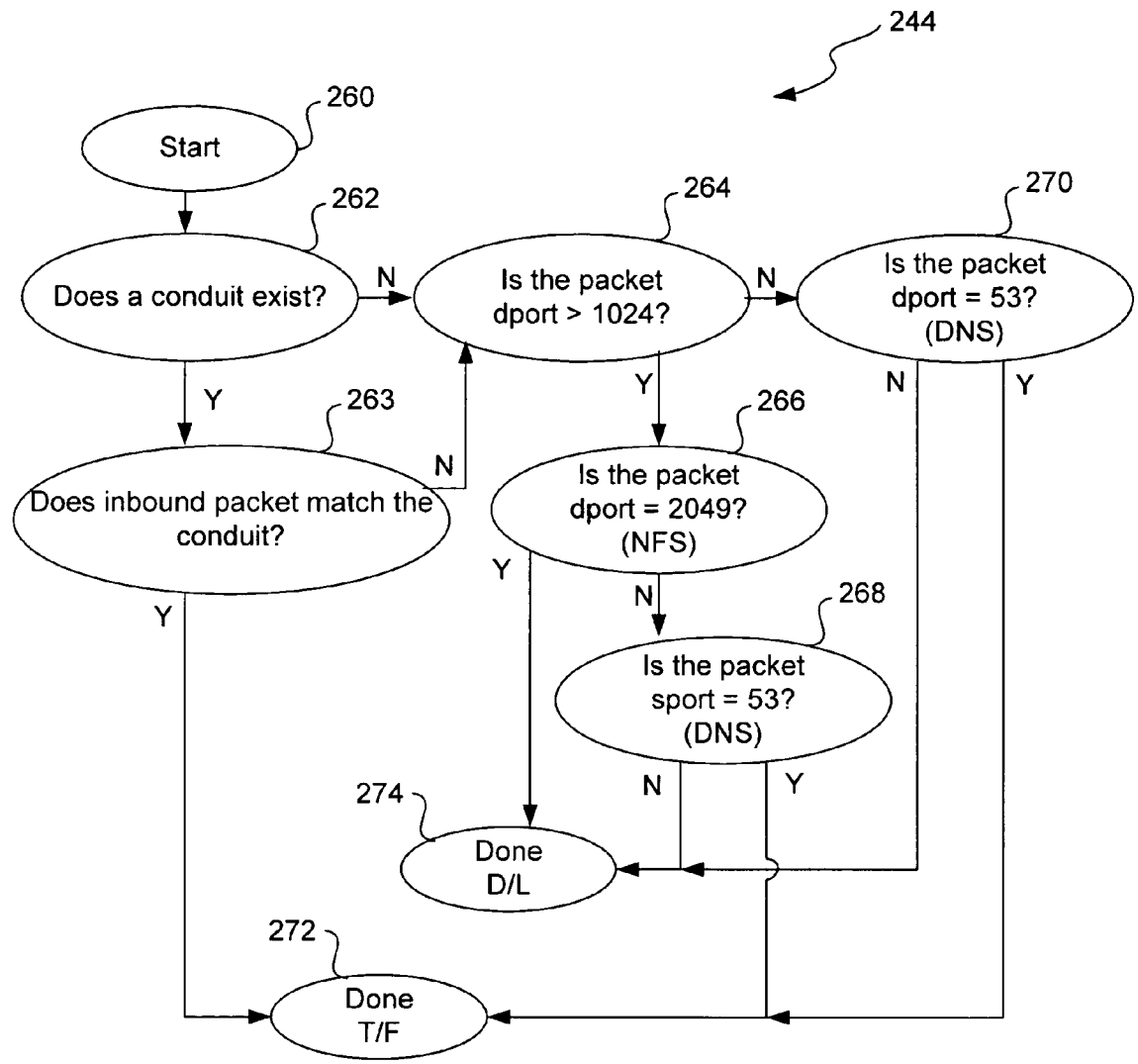
FIG. 7 is a process flow diagram depicting a process for screening UDP packets destined for a local host having a static translation slot.

The process of the determining whether an inbound UDP packet meets the specified UDP security criteria (step 244 of FIG. 6) is detailed in FIG. 7. The process begins a 260, and in a step 262 determines whether any "conduits" exists in the adaptive security mechanism associated with the static translation slot of interest. As described in more detail below, conduits are exceptions to the adaptive security rules described herein Assuming that no such conduits exists, a decision step 264 determines whether the destination port number is greater than 1024. This implies that the destination is a "nonprivileged" port, and there is a probability that the inbound packet is a normal return packet for UDP. Specifically, the packet may be a reply to a DNS (domain name service) request by a local host. If decision step 264 is answered in the affirmative, a decision step 266 determines whether the destination port is equal to value of 2049. If so, this implies that the inbound packet is an NFS (network file system) packet which should not be accepted. As is known to those of skill in the art, NFS packets are employed to access an external computer's file system as if it was local. Such access from the Internet is clearly inconsistent with the security goals of this invention. Therefore the process is completed at 274 with the packet being dropped and logged pursuant to step 228 of FIG. 5. If, however, decision step 266 is answered in the negative (i.e, the destination is not equal to 2049), a decision step 268 determines whether the source port value is equal to 53. This implies that the inbound packet is a DNS packet which should be accepted so that the local host can access a remote host by name. Thus, if decision step 268 is answered in the affirmative, the process is completed at 272 with the packet being translated in accordance with step 220 of FIG. 5.

The immediately preceding steps allow only those packets having a large destination port (>1024) and a source port equal to 53. This is consistent with DNS requests initiated by the local host.

Assuming that decision step 264 determines that the destination port value is not greater than 1024, a decision step 270 determines whether the destination port value is equal to 53. If so, the inbound packet must be a DNS request packet and should be allowed in. If decision step 270 is answered in the affirmative, the process is completed at 272 as described above. If, on the other hand, decision step 270 is answered in the negative, the process is completed at 274 as described above. In summary, the function of decision steps 264 through 270 is to ensure that the only packets allowed to cross from the Internet through translation system 34 to enterprise 36 are DNS packets. NFS packets are explicitly excluded.

If decision step 262 determines that one or more conduits exists for the static translation slot, a decision step 263 determines whether the UDP packet matches any of those conduits. If so, the process is completed at 272 as described above. If not, process control is directed to step 264 for evaluation of the packet's destination port as described above.

As mentioned, conduits are exceptions to the general adaptive security rules implemented on translation system 34. Such rules were summarized above. Each secure static translation slot will have zero or more conduits provided therewith in the "UDP Holes" and/or "TCP Holes" fields 146 and 148 (see FIG. 4A). These fields are supplied with specific conduits when the translation system is configured. Each such conduit is provided in the format protocol: address/mask-port. The "protocol" section specifies either UDP or TCP, the "address" section specifies a destination global IP address, the net "mask" section specifies how many bits of the IP address that are to be compared in the matching step, and the "port" section specifies a destination port value (e.g., 25 for mail, 24 for Telnet, etc.). The "mask" section can be set as large or small as desired. For example, if an administrator wishes to allow an entire class C address group into the conduit, the mask would be set to compare only the 24 IP address bits specifying netid. If the information contained in the inbound packet meets the criteria specified by a conduit, the conduit is "matched" pursuant to step 263 of FIG. 7.

Multiple exceptions may be applied to a single static translation slot (via multiple conduit commands). This allows the administrator to permit access from an arbitrary machine, network, or any host on the Internet to the inside host defined by the static translation slot.

Figure 8:
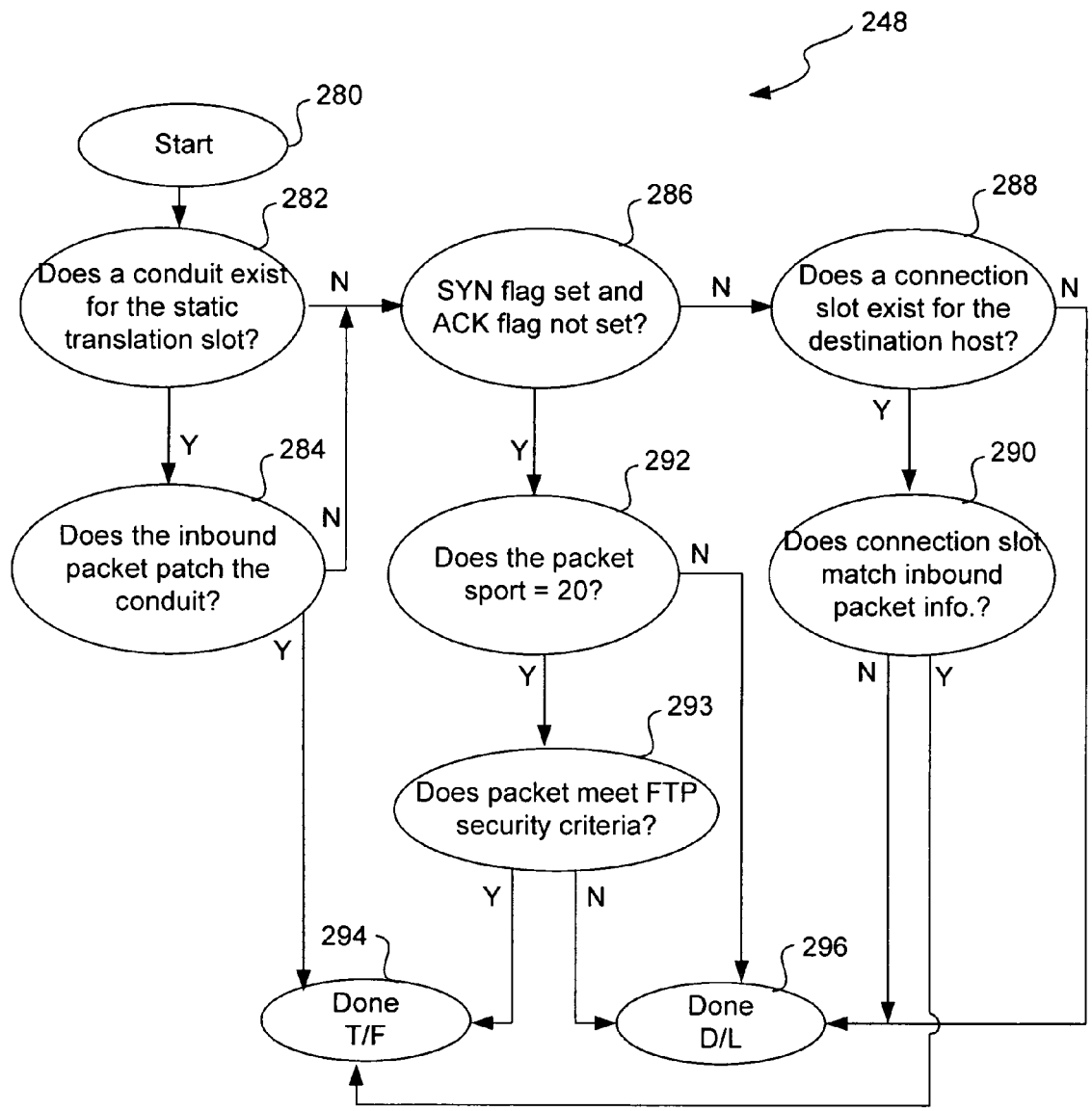
FIG. 8 is a process flow diagram depicting a process for screening TCP packets destined for a local host having a static translation slot.

FIG. 8 details the step of determining whether a TCP packet meets the specified security criteria (step 248 of FIG. 6). The process begins at 280 and in a decision step 282 determines whether a conduit exists for the static translation slot at issue. If so, a decision step 284 determines whether the information contained in the inbound packet matches any conduit for the static translations slot. This process is conducted exactly as described with reference to decision step 263 in FIG. 7. If decision step determines that there is a conduit match, the process is completed at 294 with translation and forwarding of the packet. If however, decision step 284 determines that there is no conduit match, a decision step 286 determines whether the SYN flag is set and the ACK flag is not set. If so, an external source is likely attempting an unsolicited connection to the enterprise network. In general, such packets should not be accepted unless they are part of a requested FTP file transfer.

If decision step 282 determines that there are no conduits associated with the static translation slot of the destination host, process control is directed to decision step 286. If the conditions of step 286 are not met (i.e., either the SYN flag is not set or the ACK flag is set), a decision step 288 determines whether a connection slot exists for the static translation slot at issue. If no such connection slot exists, it can be assumed that no connection was initiated by a host in the enterprise network 36. Thus, if decision step 288 is answered in the negative, the process is concluded at 296 with the packet being dropped and logged. If, however, a connection slot does exist for the static translation slot, a decision step 290 determines whether the port and IP source and destination addresses of the inbound packet match those of any connection object of the static translation slot. If no such match is found, it can again be assumed that the internal host did not initiate a connection requesting the inbound packet. Thus, if decision step 290 is answered in the negative, the process is concluded at 296 with the packet being dropped and logged. If, on the other hand, decision step 290 is answered in the affirmative (that is, the port and IP addresses in the inbound packet match those of a connection object), the process is concluded at 294 with the packet being translated and forwarded.

If decision step 286 is answered in the affirmative, a decision step 292 determines whether the source port value of the inbound packet equals 20. A source port value of 20 indicates that an FTP (file transfer protocol) data connection is being established. If decision step 292 is answered in the negative (i.e., the inbound packet is attempting to establish a connection for some purpose other than sending FTP data), the process is concluded at 296 with the packet being dropped and logged. If, however, decision step 292 is answered in the affirmative, a decision step 293 determines whether the inbound packet meets certain FTP security criteria. If so, the process is completed at 294 with the packet being translated and forwarded. If not the process ends at 296 with the packet being dropped and logged.

Figure 9:
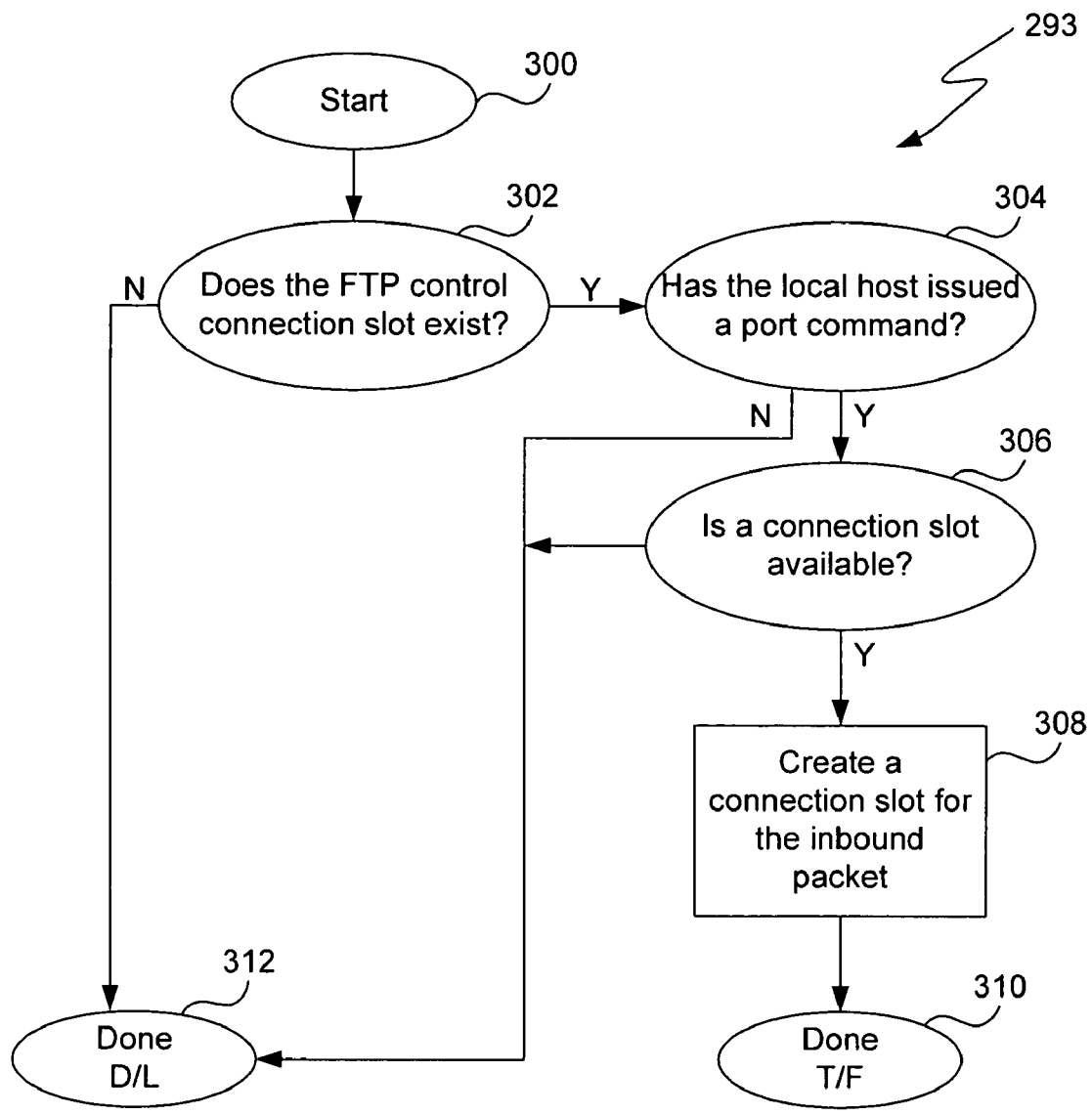
FIG. 9 is a process flow diagram depicting those steps that may be employed to screen for FTP data destined for a private network.

FIG. 9 details the process steps associated with determining whether FTP security criteria have been met (step 293 of FIG. 8). The process begins at 300 and then a decision step 302 determines whether an FTP control connection slot exists for the translation slot of the local host. This can be determined by a destination port number of 21 in the "fport" field 168 of a connection slot for the local host (see FIG. 4B). If so, the host associated with the static translation slot has initiated an FTP control session and the inbound packet may possibly accepted. As is known to those of skill in the art, FTP consists of two connections: first a local host logs into a remote server with a control connection and then the remote server responds with a data connection to the local host. Assuming that an FTP control connection slot exists, a decision step 304 determines whether the local host has issued a PORT command. This may be established by checking for a "port" flag in the flags field of the translation slot (see FIG. 4A). Assuming that such port command has been issued, a decision step 306 determines whether a new connection slot is available. It is possible that the translation system 34 may have too many simultaneous connections to allocate a new connection slot. That is, it is of course possible that all available connection slots are in use. If, however, one or more additional connection slots are available (i.e., decision step 306 is answered in the affirmative), a process step 308 creates a new connection slot for the inbound FTP data packet. Concurrently therewith, the new connection is registered in the "connection field" of the translation slot. Thereafter the process is completed at 310 with the inbound packet being translated and forwarded. If any of decision steps 302, 304, or 306 are answered in the negative, the process is concluded at 312 with the packet being dropped and logged.

Figure 10:
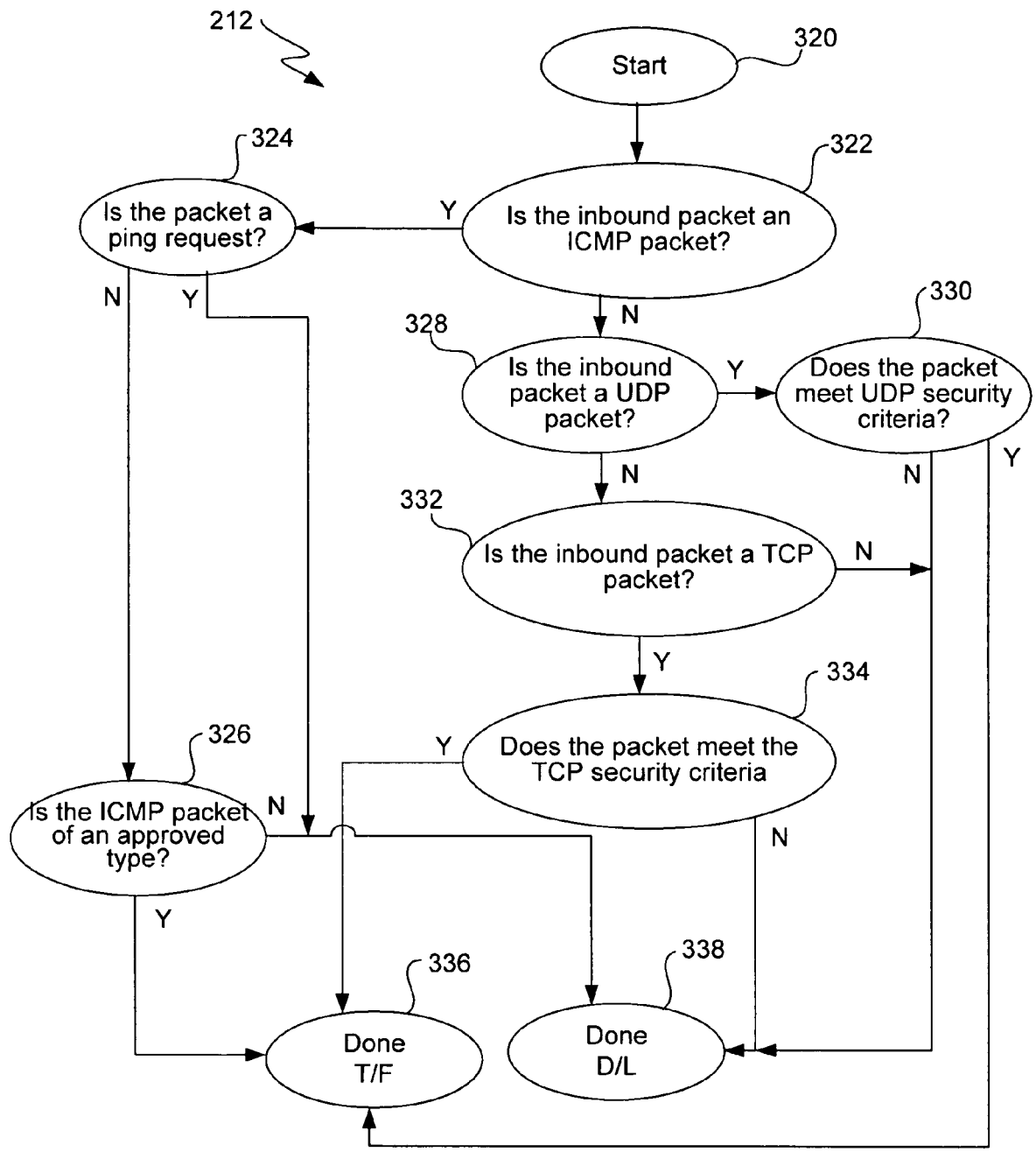
FIG. 10 is a process flow diagram depicting generally a security algorithm for screening packets destined for a local host having a dynamic translation slot.

As noted above in the context of FIG. 5, inbound packets that are not destined for static translation slots may be destined for dynamic translation slots. In fact, all translation slots are either static or dynamic. Thus, if a translation slot exists for the destination of an inbound packet, and that destination does not have a static translation slot, then it must have a dynamic translation slot. As noted in connection with the discussion of FIG. 5, a decision step 212 determines whether such inbound packets meet the security requirements for dynamic translation slots. FIG. 10 details a process by which such security requirements are evaluated. The process begins at 320, and in a decision step 322 the translation system determines whether the inbound packet is an ICMP packet. If so, decision step 324 determines whether that packet contains a "ping" request (ICMP echo message—type 8). If so, the process is completed at 338 with the inbound packet being dropped and logged. If on the other hand, the ICMP packet is not a ping request, a decision step 326 determines whether the inbound packet is one of the approved types of packets. If decision step 326 determines that the inbound ICMP packet is not one of the approved types, the process is concluded at 338 with the packet being dropped and logged. If, on the other hand, the ICMP packet is of an approved type, the process is concluded at 336 with the packet being translated and forwarded.

A comparison of the processes depicted in FIGS. 5 and 10 shows that ICMP packets are treated similarly when destined for hosts with either static or dynamic translation slots. However, a host with a static translation slot will accept a ping request (ICMP message type 8) while a host with a dynamic translation slot will not. Thus, external sources can establish the presence of static hosts but not dynamic hosts. This is because the dynamic hosts change IP addresses from time to time and are intended to be shielded behind translation system.

Returning now to FIG. 10, assuming that the inbound packet is not an ICMP packet (i.e., decision step 322 is answered in the negative), a decision step 328 determines whether the inbound packet is a UDP packet. If so, a decision step 330 determines whether the inbound UDP packet meets the security criteria appropriate for a dynamic translation slot. If so, the process is concluded at 336 with the packet being translated and forwarded. If not, the process is concluded at 338 with the packet being dropped and logged.

Assuming that the inbound packet is neither an ICMP packet nor a UDP packet (i.e., both decision steps 322 and 328 are answered in the negative), a decision step 332 then determines whether the inbound packet is a TCP packet. If not, the process is concluded at 338 with the packet being dropped and logged. If, on the other hand, the packet is indeed a TCP packet, a decision step 334 determines whether that packet meets the adaptive security criteria required of a TCP packet destined for a host having a dynamic translation slot. If so, the process is concluded at 336 with the packet being translated and forwarded. If not, the process is concluded at 338 with the packet being dropped and logged.

The UDP and TCP security criteria for inbound packets are nearly identical for hosts having static translation slots and hosts having dynamic translation slots. The only difference is that hosts with static translation slots can have conduits or exceptions to the security mechanism. The following discussion of FIGS. 11 and 12 will illustrate this.

Figure 11:
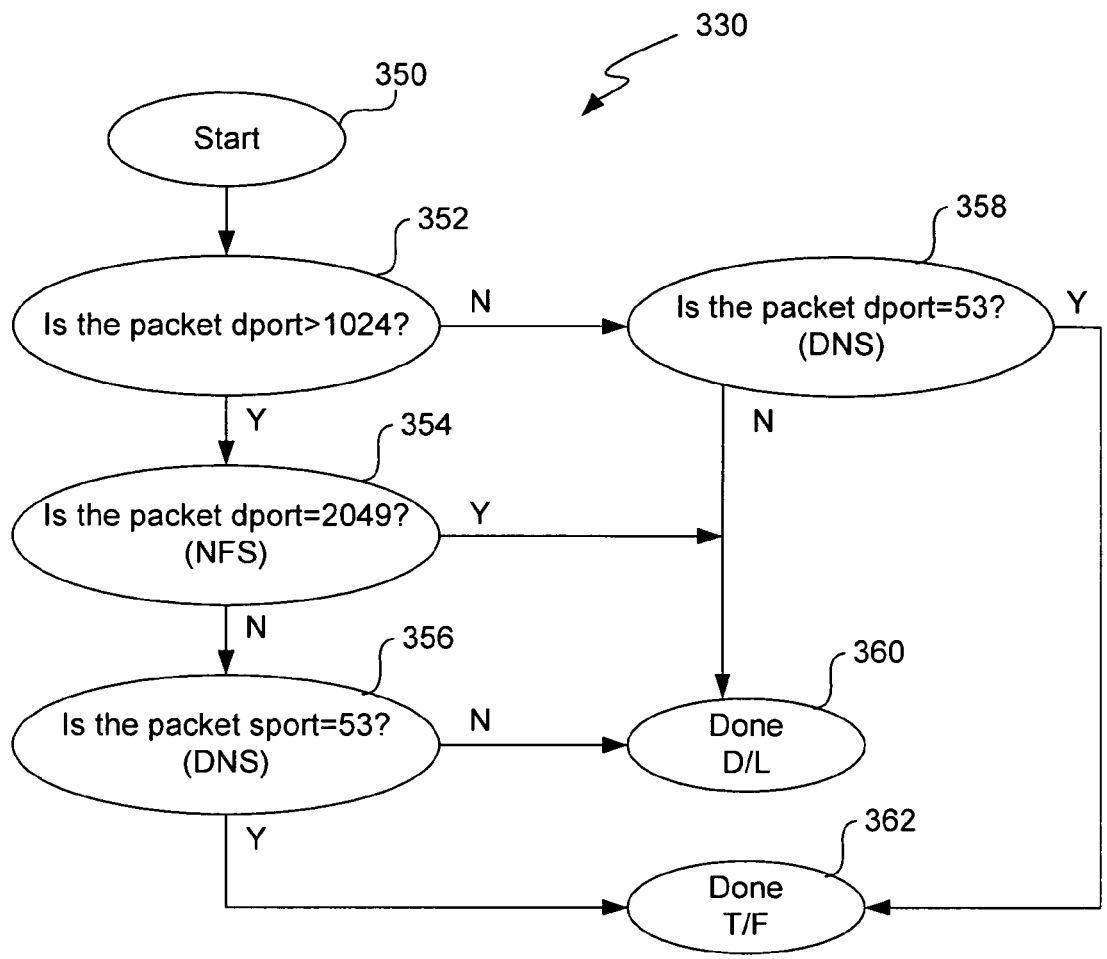
FIG. 11 is a process flow diagram depicting a process for screening UDP packets destined for a local host having a dynamic translation slot.

The process of the determining whether an inbound UDP packet meets security criteria for a dynamic slot (step 330 of FIG. 10) is detailed in FIG. 11. The process begins a 350, and a decision step 352 evaluates the incoming packet to determine whether its destination port number is greater than 1024. If so, a decision step 354 determines whether the destination port is equal to a value of 2049. If so, this implies that the inbound packet is an NFS (network file system) packet which should not be accepted. In such cases, the process is completed at 360 with the packet being dropped and logged. If, however, decision step 354 is answered in the negative (i.e, the destination is not equal to 2049), a decision step 356 determines whether the source port value is equal to 53. This implies that the inbound packet is a DNS packet which should be accepted. Thus, if decision step 356 is answered in the affirmative, the process is completed at 362 with the packet being translated and forwarded.

Assuming that decision step 352 determines that the destination port value is not greater than 1024, a decision step 358 determines whether the destination port value is equal to 53. If so, the inbound packet must be a DNS request packet and should be allowed in. Thus, if decision step 358 is answered in the affirmative, the process is completed at 362 as described above. If, on the other hand, decision step 358 is answered in the negative, the process is completed at 360 as described above. As in the case of static translation slots, the only packets allowed to cross from the Internet through translation system 34 to enterprise network 36 are DNS packets. NFS packets are explicitly excluded.

Figure 12:
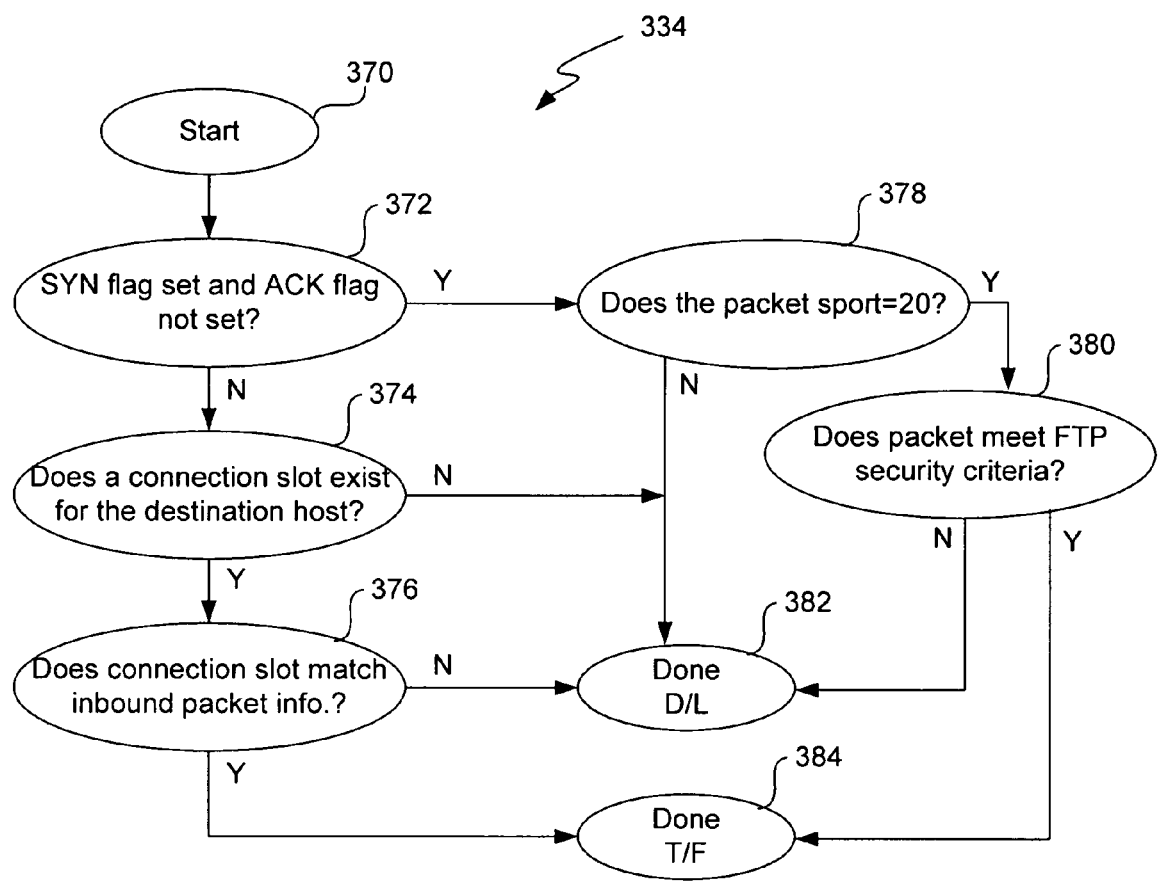
FIG. 12 is a process flow diagram depicting a process for screening TCP packets destined for a local host having a dynamic translation slot.

FIG. 12 details the process of determining whether a TCP packet meets the security criteria for a dynamic slot (step 334 of FIG. 10). The process begins at 370 and in a decision step 372 examines the incoming packet and determines whether the SYN flag is set and the ACK flag is not set. If not, a decision step 374 determines whether a connection slot exists for the dynamic translation slot at issue. If no such connection slot exists, it can be assumed that no connection was initiated by a host in the enterprise network 36. Thus, if decision step 374 is answered in the negative, the process is concluded at 382 with the packet being dropped and logged. If, however, a connection slot does exist for the dynamic translation slot, a decision step 376 determines whether the port and IP source and destination addresses of the inbound packet match those of any connection object of the dynamic translation slot. If no such match is found, it can again be assumed that the internal host did not initiate a connection requesting the inbound packet. Thus, if decision step 376 is answered in the negative, the process is concluded at 382 with the packet being dropped and logged. If, on the other hand, decision step 376 is answered in the affirmative (that is, the port and IP addresses in the inbound packet match those of a connection object), the process is concluded at 384 with the packet being translated and forwarded.

If decision step 372 is answered in the affirmative, a decision step 378 determines whether the source port value of the inbound packet equals 20. As noted, a source port value of 20 indicates that an FTP data connection is being established. If decision step 378 is answered in the negative (i.e., the inbound packet is attempting to establish a connection for some purpose other than sending FTP data), the process is concluded at 382 with the packet being dropped and logged. If, however, decision step 378 is answered in the affirmative, a decision step 380 determines whether the inbound packet meets certain FTP security criteria. If so, the process is completed at 384 with the packet being translated and forwarded. If not the process ends at 382 with the packet being dropped and logged. The FTP security criteria referenced in step 380 may be identical to those set forth in FIG. 9.

Although the foregoing invention has been described in some detail for purposes of clarity of understanding, it will be apparent that certain changes and modifications may be practiced within the scope of the appended claims. For example, the private network described above may be a single local area network or multiple local area networks connected as a wide area network. Further, the adaptive security algorithm described above may be applied to a single machine as well as a network.

What is claimed is:

1. An apparatus configured to provide network connections between nodes on a local network and nodes outside the local network, the apparatus comprising:
   a first processor;
   memory in communication with the first processor; and
   a firewall specifying at least one security criterion and configured to protect the local network from packets that pose a security risk;
   wherein the apparatus is operable to:
   perform network address translation of network layer addresses associated with packets exchanged between nodes on the local network and nodes outside the local network;
   generate a network address translation list including at least one translation, each specifying a local network layer address of a local node and an associated global unique network layer address;
   match IP addresses in packets against IP addresses specified in the local network layer address or the associated global unique network layer address of the at least one translation in the network address translation list.

2. The apparatus as recited in claim 1, wherein at least one entry of the address translation list includes information defining a connection between said local node of the local network and a foreign host outside the local network.

3. The apparatus as recited in claim 1, further comprising a collection of global IP addresses available to hosts on the local network.

4. The apparatus as recited in claim 1, further comprising an outside interface connected to an external network and an inside interface connected to the local network.

5. The apparatus as recited in claim 1, wherein the apparatus is a network device including a plurality of ports for communication with at least one network medium, and associated logic controlling communications through the ports.

6. The apparatus as recited in claim 1, wherein the at least one security criterion includes, when a packet indicates that a data connection is to be opened, determining whether a control connection exists for the data connection.

7. An method for providing network connections between nodes on a local network and nodes outside the local network, the method comprising:
   performing network address translation of network layer addresses associated with packets exchanged between nodes on the local network and nodes outside the local network;
   generating, using a first computer-based processing unit, a network address translation list including at least one translation, each specifying a local network layer address of a local node and an associated global unique network layer address; and
   matching IP addresses in packets against IP addresses specified in the local network layer address or the associated global unique network layer address of the at least one translation in the network address translation list.

8. The method of claim 7 further comprising:
   identifying at least one security criterion for protecting the local network from packets that pose a security risk.

9. The method as recited in claim 7, wherein at least one entry of the address translation list includes information defining a connection between said local node of the local network and a foreign host outside the local network.

10. The method as recited in claim 7, further comprising:
    providing a collection of global IP addresses which are available to hosts on the local network.

11. The method as recited in claim 7 further comprising:
    determining whether a control connection exists for a data connection when a packet indicates that the data connection is to be opened.

12. A system for providing network connections between nodes on a local network and nodes outside the local network, the system comprising:
    at least one processor;
    memory;
    means for performing network address translation of network layer addresses associated with packets exchanged between nodes on the local network and nodes outside the local network;
    means for generating a network address translation list including at least one translation, each specifying a local network layer address of a local node and an associated global unique network layer address; and means for matching IP addresses in packets against IP addresses specified in the local network layer address or the associated global unique network layer address of the at least one translation in the network address translation list.

13. The system of claim 12 further comprising:

means for identifying at least one security criterion for protecting the local network from packets that pose a security risk.

14. The system as recited in claim 12, wherein at least one entry of the address translation list includes information defining a connection between said local node of the local network and a foreign host outside the local network.

15. The system as recited in claim 12, further comprising:

means for providing a collection of global IP addresses which are available to hosts on the local network.

16. The system as recited in claim 12 further comprising:

means for determining whether a control connection exists for a data connection when a packet indicates that the data connection is to be opened.

* * * * *